United States Patent
Wu et al.

(10) Patent No.: US 8,000,860 B2
(45) Date of Patent: Aug. 16, 2011

(54) STEERING ANGLE SENSOR

(75) Inventors: Ruh-Hua Wu, Tao-Yuan (TW); Chung-Tseng Chang, Bade (TW); Jyh Chiang Liou, Zhong He (TW)

(73) Assignee: Chung Shan Institute of Science and Technology, Armaments Bureau, M.N.D., Taoyuan County (TW)

( * ) Notice: Subject to any disclaimer, the term of this patent is extended or adjusted under 35 U.S.C. 154(b) by 1140 days.

(21) Appl. No.: 11/730,777

(22) Filed: Apr. 4, 2007

(65) Prior Publication Data
US 2008/0249683 A1 Oct. 9, 2008

(51) Int. Cl.
*B62D 5/00* (2006.01)
(52) U.S. Cl. .......................... 701/41; 180/443
(58) Field of Classification Search .............. 701/41; 180/443–444; 310/71, 67 R, 68 R, 75 R, 310/83, 98, 99; 74/388 R, 388 PS; 33/1 N, 33/1 PT, 534; 73/117.02; 439/13–15, 164
See application file for complete search history.

(56) References Cited

U.S. PATENT DOCUMENTS

| | | | | |
|---|---|---|---|---|
| 4,598,787 | A * | 7/1986 | Drutchas | 180/444 |
| 4,803,629 | A * | 2/1989 | Noto et al. | 701/41 |
| 7,347,433 | B2 * | 3/2008 | Pressler et al. | 280/93.5 |
| 7,591,338 | B2 * | 9/2009 | Irikura | 180/242 |

* cited by examiner

*Primary Examiner* — Dalena Tran
(74) *Attorney, Agent, or Firm* — Rosenberg, Klein & Lee

(57) ABSTRACT

The present invention relates to a steering angle sensor, which includes a substrate. A shaft bore and a first gear are adapted on the substrate. The first gear has a shaft sleeve, which passes through the shaft bore. And a steering column of a steering wheel passes through the shaft sleeve. A second gear is adapted on the substrate, and is in mesh with the first gear. A rotary sensor is located atop and assembled with the second gear. Besides, a signal processing circuit is coupled electrically with the rotary sensor. By simply meshing the first and the second gears and passing the steering column of the steering wheel through the first gear, when the steering wheel turns, the second gear will be driven to turn as well, which, in turn, drives the rotary sensor. Thereby, the number of components in the steering angle sensor is reduced, and the volume thereof is reduced effectively as well.

10 Claims, 4 Drawing Sheets

STEERING ANGLE SENSOR

FIELD OF THE INVENTION

The present invention relates generally to a steering angle sensor, and particularly to a steering angle sensor with a single rotary sensor and without a reducer means.

BACKGROUND OF THE INVENTION

A steering angle sensor (SAS) is an important component in an advanced automobile driving and control system. Its function is to measure the steering angle and the angular velocity of the steering wheel. The output of an ideal SAS shall indicate the possible rotational range of the steering wheel, which is +/−2.5 turns, or equivalently +/−900 degrees. The information of the angular velocity of the steering wheel, which is useful for the safety control of the vehicle, should be provided as well. As regard the environment for operation, a SAS should be able to tolerate the harsh condition in an automobile, which includes vibration, high humidity and temperature up to 80 degree C. In addition to the environmental requirement, a SAS shall be able to work properly with the unregulated battery power available in the vehicle, which might vary from 8 to 30 Volts due to the variation of the engine operation. While mounted in the very restricted space, the SAS shall be designed to adopt various diameters of steering columns.

Among the above-mentioned requirements, the most severe challenge to the design of a SAS is the vibration induced from the running engine. The frequency of the fundamental and harmonic vibrations can be up to several kHz. Such vibrations can cause the dithering effect and ruin sensors of contact type installed on the steering column. Therefore angle sensors of contact type, such as plastic-conductive-film potentiometers, are not adequate for the SAS. Furthermore, due to the humid and dusty environment, the optical devices are not suitable, either.

Finally, the SAS shall be able to communicate with the Electronic Control Unit (ECU) of the vehicle. For example, the Control Area Network (CAN) is a popular protocol widely used in the communication within the vehicle. The SAS shall include communication port with the ECU.

FIG. 1 shows a structural schematic diagram of a SAS according to the prior art. As shown in the figure, a steering column 12 inserts into the center of a main gear 14, and drives said main gear 14 to turn. The main gear 14 drives a first gear 15 and a second gear 16, wherein the numbers of gear teeth between the two gears differ by one. A set of magnet 17 is installed at the centers of the first gear 15 and the second gear 16, respectively. Above the magnets 17, Hall-effect sensors 18 are used for sensing the rotary angles of the first gear 15 and the second gear 16. When the main gear 14 turns by θ degrees, the first gear 15 and the second gear 16 turn by $\phi_1$ and $\phi_2$ degrees, respectively. The numbers of gear teeth of the main gear 14, the first gear 15, and the second gear 16 make θ and $(\phi_1-\phi_2)$ have a one-on-one mapping in the rotary range of 0~1560 degrees. Thereby, the rotary angle of the main gear 14 can be deduced from the difference between the output angles of the first and the second gears 15, 16. The sensing range exceeds 360 degrees. A single chip is used for calculating the output angles of the SAS according to the prior art. In practice, there are other combinations of gears to achieve the same function.

The Hall-effect sensors 18 of the first and the second gears 15, 16 are used to be an absolute angle sensor. After assembly and setting up zero point, the output of the sensor is the absolute rotary angle of the main gear 14 (0~1560 degrees, 0 degree is set at −2.5-th turn). The output of the sensor will not exceed 1560 degrees. If the rotary angle of the main gear 14 exceeds the range, the SAS will still have output. However, the user will not know that the output is false. If the sensing range needs to be expanded, the number of gear teeth has to be re-calculated.

At present, there exists another type of steering angle sensor, which is used in the electro-hydraulic controlled brake module. This type of sensors adopts two sets of potentiometers. By a 90-degree phase difference between the two potentiometers, the steering angle is resolved. On the other hand, there exists another steering angle sensor with a multi-turn potentiometer. The rotary angle of the multi-turn potentiometer exceeds 360 degrees. Currently, multi-turn contact potentiometers are available. The absolute angular sensing range can reach 3600 degrees, which can satisfy the functional demands of the SAS without using a gear box. Instead, it can be driven directly by the steering column 12. However, as mentioned above, the contact-type sensors are not adequate for the SAS used in the vehicle.

Current steering angle sensors mostly adopt optical encoders and complicated reducer means. For example, the U.S. Pat. No. 4,955,228 uses optical encoders and means as the rotary sensor. A small part of current steering angle sensors adopts non-contact linear Hall-effect sensors as the rotary sensor, such as the Japanese Patent Laid-Open Publication No. H11-287608, in which ratchets, worm shafts, and Hall-effect sensors are used to form the rotary sensor. The non-contact angle sensor for automobiles and motorcycles of Taiwan utility model No. M285694 adopts magnetic sensors and microprocessors to construct the rotary sensor. However, the utility model provides only a framework without describing methods for sensing multi-turn steering angles. Besides, it does not describe adopted types and quantities of the sensors either. To the best knowledge of the inventors, all the current steering angle sensors use two sets of angle sensors for sensing +/−2.5-turn of absolute angles.

Thereby, the present invention provides a steering angle sensor, which uses only a pair of simple gears for transmitting rotary angles from the steering column to the sensor. A single rotary sensor with a sensing range of 0~360 degrees is used for sensing the rotation of the steering column.

SUMMARY

The objective of the present invention is to provide a steering angle sensor, in which a first gear and a second gear are simply in mesh and the steering column of a steering wheel is adapted in the first gear, such that when the steering wheel is turned, the second gear will be driven as well, which, in turn, drives the rotary sensor. Thereby, the number of components in the steering angle sensor is reduced, and hence reducing the volume of the steering angle sensor effectively. In addition, it is not necessary to design the reducer ratio of the first and the second gears for converting rotary angles of the steering wheel. Thereby, the rotary angle of the rotary sensor can be greater than the rotary angle of the steering wheel. A microprocessor is applied to adapt variable gear ratio in the SAS module.

Another objective of the present invention is to provide a steering angle sensor, which needs to install a single rotary sensor in the second gear only. That is, the angular sensor used in this proposed invention is only one half of the existing products.

DETAILED DESCRIPTION

In order to make the structure and characteristics as well as the effectiveness of the present invention to be further understood and recognized, the detailed description of the present invention is provided as follows along with preferred embodiments and accompanying figures.

Figure 1:
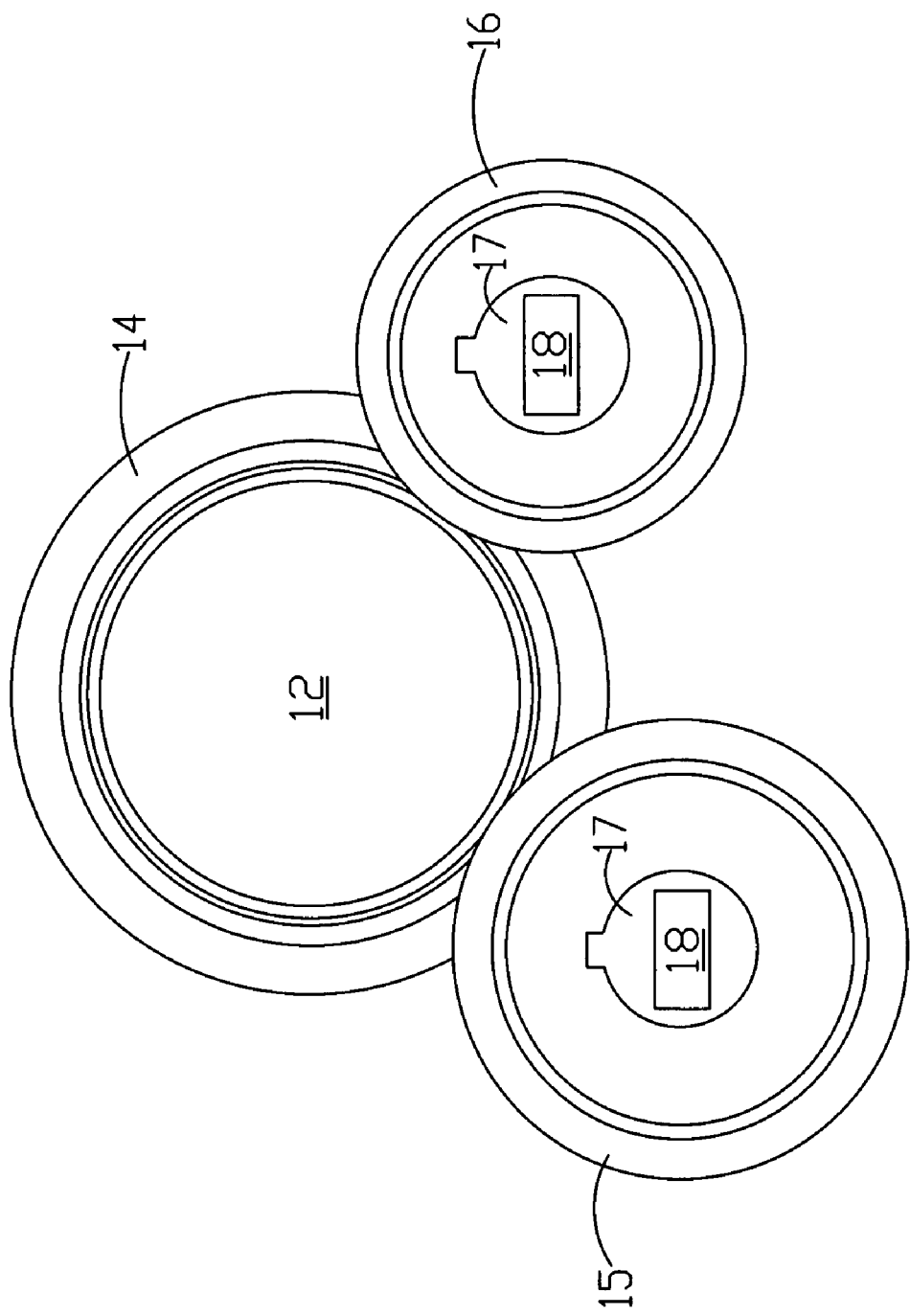
FIG. 1 shows a structural schematic diagram of a steering angle sensor according to the prior art.
Figure 2:
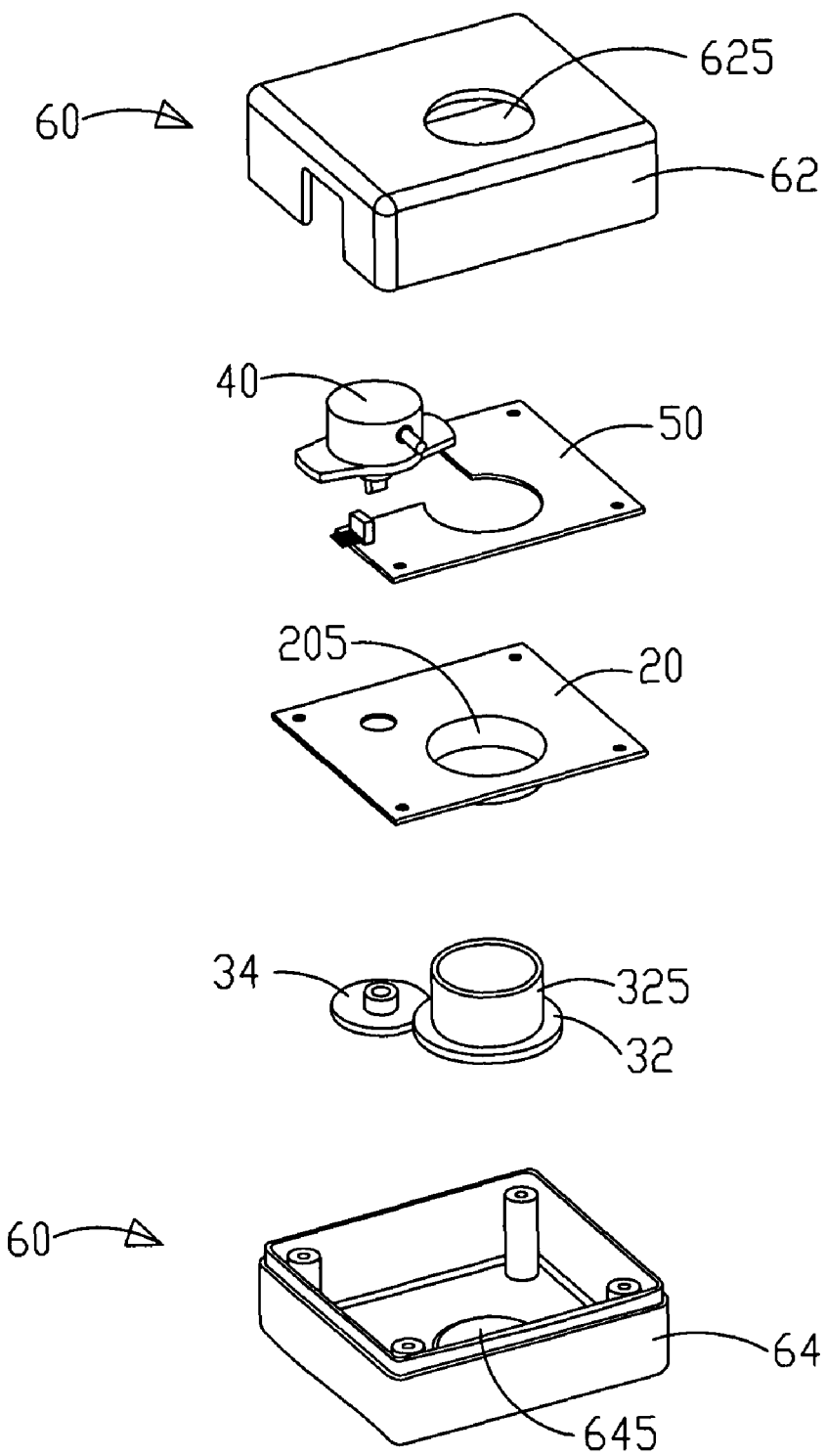
FIG. 2 shows a three-dimensional view of a steering angle sensor according to a preferred embodiment of the present invention.
Figure 3:
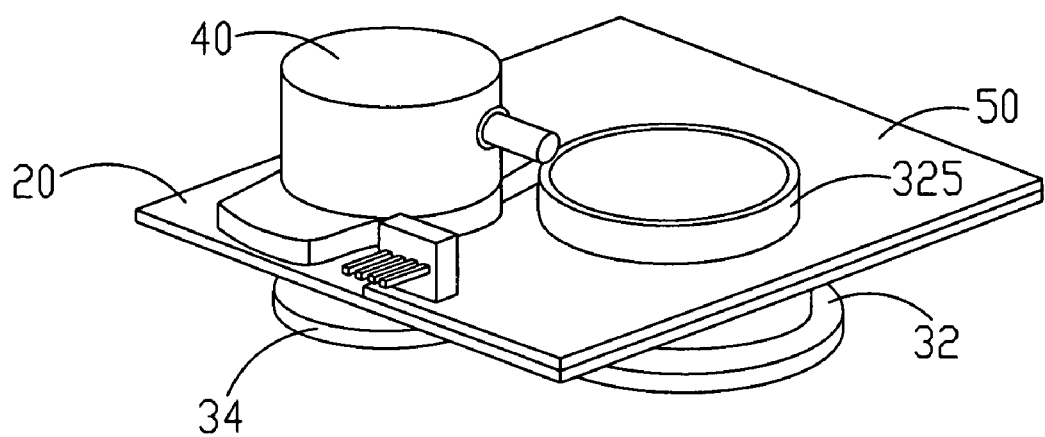
FIG. 3 shows a structural schematic diagram of a steering angle sensor according to a preferred embodiment of the present invention.

FIG. 2 and FIG. 3 show a three-dimensional view and a structural schematic diagram, respectively, of a steering angle sensor according to a preferred embodiment of the present invention. As shown in the figures, the steering angle sensor according to the present invention includes a substrate 20, a first gear 32, a second gear 34, and a rotary sensor 40. A shaft bore 205 and the first gear 32 are adapted on the substrate 20. The first gear 32 has a shaft sleeve 325, which passes through the shaft bore 205. The second gear 34 is adapted on the substrate 20, and is in mesh with the first gear 32. The rotary sensor 40 is located atop and assembled with the second gear 34. The present invention further includes a signal processing circuit 50, which is coupled electrically with the rotary sensor 40. The signal processing circuit 50 receives the output signal transmitted by the rotary sensor 40. Besides, the signal processing circuit 50 also calculates the steering angle of the steering wheel according to the characteristics of the output of the rotary sensor 40 by means of software, and finally outputs the absolute steering angle of a steering wheel.

The gear ratio between the first gear 32 and the second gear 34 according to the present invention can be 1:1 or other ratios without the need of designing special reducer means. By simply meshing the first and the second gears 32, 34 and passing a steering column of the steering wheel through the first gear 32, when the steering wheel turns, the second gear 34 will be driven to turn as well, which, in turn, drives the rotary sensor 40. Thereby, the number of components in the steering angle sensor is reduced, and the volume thereof is reduced effectively as well. Furthermore, for different steering columns of various automobile models, whose outer diameters are in general between 25 to 30 centimeters, shaft sleeves 325 with different inner diameters can be designed according to the practical outer diameters of the steering columns.

Figure 4:
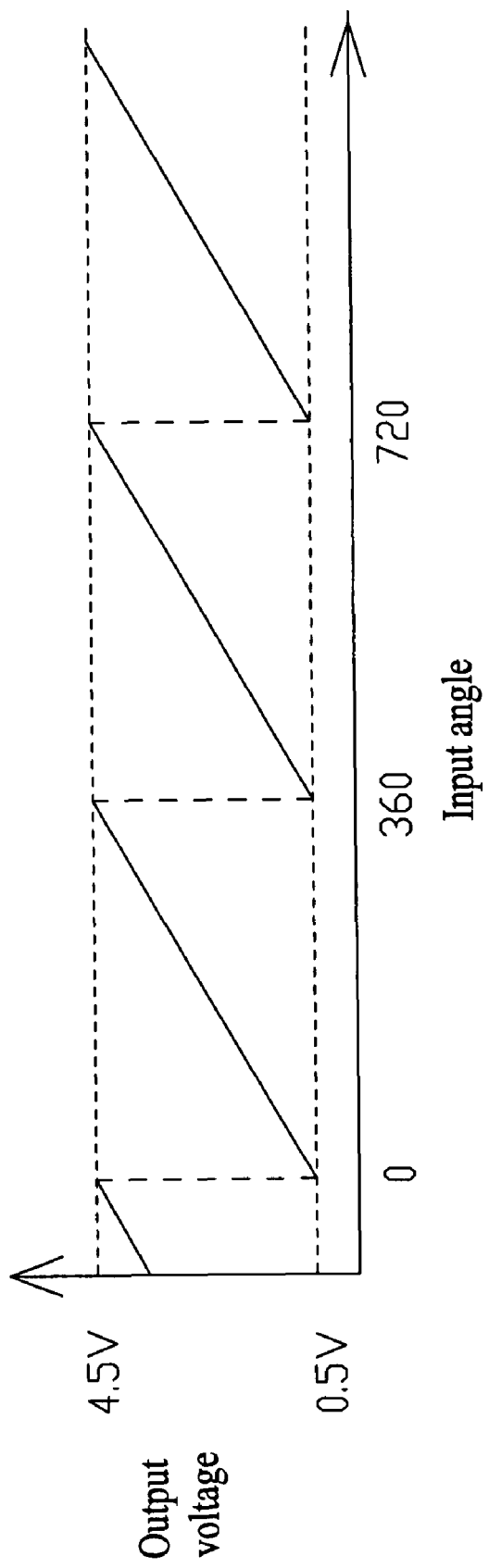
FIG. 4 shows a characteristic curve between the output signal and the steering angle of a non-contact Hall-effect rotary sensor.

FIG. 4 shows a characteristic curve between the output signal and the steering angle of a non-contact Hall-effect rotary sensor. The rotary sensor 40 according to the present invention is a single-turn rotary sensor. The single-turn rotary sensor according to the present invention can be a non-contact Hall-effect rotary sensor, which includes analog-voltage output and pulse-width-modulation (PWM) output depending on requirements of a user. The anti-interference capability of the PWM output is superior. The characteristic of this type of sensor is that the output axis can rotate continuously, and in the range of 0 to 360 degree, the relation between the output and input angles is linear. However, from 360 to 0 degree, discontinuity occurs at output. The steering angle sensor according to the present invention allows the rotary angle of the rotary sensor 40 to exceed 360 degree. A single-chip program is used for converting the 0~360 range of the rotary sensor to the ±1800 rotary range of the steering wheel.

The single-turn rotary sensor is not limited to non-contact Hall-effect rotary sensor. Rotary sensors with similar characteristics, such as a normal incremental or absolute optical decoder or a resolver, can be adopted as well.

The present invention further includes a shell 60 with a top bore 625 and a bottom bore 645. The substrate 20 is adapted in the shell 60. The shaft bore aligns with the top and the bottom bores 625, 645. The shell 60 includes a top shell 62 and a bottom shell 64. The top and the bottom shells 62, 64 assemble with each other. The substrate 20 is adapted in the bottom shell 64. The top bore 625 is adapted on the top shell 62, while the bottom bore 645 is adapted on the bottom shell 64.

To sum up, the steering angle sensor according to the present invention includes a substrate, a first gear, a second gear, and a rotary sensor. A shaft bore and the first gear are adapted on the substrate. The first gear and the second gear are adapted on the substrate, and are in mesh with each other. The rotary sensor is located atop and assembled with the second gear. By passing the steering column of the steering wheel through the first gear, when the steering wheel turns, the second gear will be driven to turn as well, which, in turn, drives the rotary sensor. Thereby, the number of components in the steering angle sensor is reduced, and the volume thereof is reduced effectively as well. The present invention uses a single rotary sensor for sensing multi-turn rotary angles. It can be applied in steering sensor, adaptive frontlight system, and tire angle sensor of automobiles or motorcycles. In addition, it can be applied to other applications requiring high performance, high resolution, and extremely large rotary angles as well.

Accordingly, the present invention conforms to the legal requirements owing to its novelty, non-obviousness, and utility. However, the foregoing description is only a preferred embodiment of the present invention, not used to limit the scope and range of the present invention. Those equivalent changes or modifications made according to the shape, structure, feature, or spirit described in the claims of the present invention are included in the appended claims of the present invention.

The invention claimed is:

1. A steering angle sensor, comprising:
   a substrate, adapted with a shaft bore;
   a first gear, adapted on the substrate, having a shaft sleeve passing through the shaft bore, and a steering column of a steering wheel passing through the shaft sleeve;
   a second gear, adapted on the substrate and meshing with the first gear;
   a rotary sensor, adapted atop and assembled with the second gear; and
   a signal processing circuit, connected electrically with the rotary sensor.

2. The steering angle sensor of claim 1, wherein the rotary sensor is a single-turn rotary sensor.

3. The steering angle sensor of claim 2, wherein the single-turn rotary sensor is a non-contact Hall-effect rotary sensor.

4. The steering angle sensor of claim 2, wherein the single-turn rotary sensor is an absolute encoder.

5. The steering angle sensor of claim 2, wherein the single-turn rotary sensor is an incremental encoder.

6. The steering angle sensor of claim 2, wherein the single-turn rotary sensor is a resolver.

7. The steering angle sensor of claim 1, and further comprising a shell having a top bore and a bottom bore, the substrate being adapted in the shell, and the shaft bore aligning with the top bore and the bottom bore.

8. The steering angle sensor of claim 7, wherein the shell includes a top shell and a bottom shell, the top shell and the bottom shell assembling with each other, the substrate being adapted in the bottom shell, the top bore being adapted on the top shell, and the bottom bore being adapted on the bottom shell.

9. A vehicle incorporating a steering angle sensor, comprising:
- a substrate, adapted with a shaft bore;
- a first gear, adapted on the substrate, having a shaft sleeve passing through the shaft bore, and a steering column of a steering wheel passing through the shaft sleeve;
- a second gear, adapted on the substrate and meshing with the first gear;
- a rotary sensor, disposed on and assembled with the second gear; and
- a signal processing circuit, connected electrically with the rotary sensor.

10. A steering angle sensor, comprising:
- a substrate, adapted with a shaft bore;
- a first gear, adapted on the substrate, having a shaft sleeve passing through the shaft bore, and adapted to accept a steering column of a steering wheel passing through the shaft sleeve and operably couple therewith;
- a second gear, adapted on the substrate and meshing with the first gear;
- a rotary sensor, disposed in communication with the second gear; and
- a signal processing circuit, connected electrically with the rotary sensor.

* * * * *